(12) United States Patent
Cesarini et al.

(10) Patent No.: US 6,656,300 B1
(45) Date of Patent: Dec. 2, 2003

(54) HIGH PERFORMANCE TIRE FOR VEHICLES

(75) Inventors: Riccardo Cesarini, Bergamo (IT); Gianfranco Colombo, Concorezzo (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/534,875

(22) Filed: Mar. 24, 2000

Related U.S. Application Data

(63) Continuation of application No. PCT/EP98/06182, filed on Sep. 25, 1998.
(60) Provisional application No. 60/063,848, filed on Oct. 31, 1997.

(30) Foreign Application Priority Data

Sep. 26, 1997 (EP) .......................................... 97830471

(51) Int. Cl.[7] .................. B60C 11/03; B60C 103/00; B60C 115/00; B60C 119/00; B29D 30/00
(52) U.S. Cl. ................. 156/110.1; 152/209.18; 152/209.26; 152/209.27; 152/209.28; 152/904; 152/DIG. 3
(58) Field of Search .................... 152/209.1, 209.2, 152/209.11, 209.13, 209.18, 904, DIG. 3, 209.26, 209.27, 209.28; 156/110.1; D12/558, 559

(56) References Cited

U.S. PATENT DOCUMENTS

| 1,127,517 A | * | 2/1915 | Richardson | ............ 152/209.28 |
| 1,996,418 A | | 4/1935 | Hargraves | |

(List continued on next page.)

FOREIGN PATENT DOCUMENTS

| DE | 3901624 | * | 8/1989 | ................. 152/904 |
| EP | 688685 | * | 12/1995 | ............ 152/209.28 |
| EP | 722851 | * | 7/1996 | ............ 152/209.28 |
| FR | 794 233 | | 2/1936 | |
| GB | 2193933 | * | 2/1988 | ............ 152/209.26 |
| GB | 2224472 | * | 5/1990 | ............ 152/209.28 |
| IT | 469844 | * | 3/1953 | |
| JP | 63-121505 | * | 5/1988 | |
| JP | 4-154408 | * | 5/1992 | ............ 152/209.28 |
| JP | 04-254205 | | 9/1992 | |
| JP | 4-254205 | * | 9/1992 | |
| WO | WO 98/25776 | | 6/1998 | |

OTHER PUBLICATIONS

T. Suzuki, "Pneumatic Tire", Patent Abstracts of Japan, JP 04 154408, (1992), Abstract Only.

K. Yoshida & T. Kamiya, "Stability and Steering Response in Two–Wheeled Vehicle," Journal of the Society of Automotive Engineers of Japan, Inc., vol. 26, pp. 866–872 (Tokyo, Society of Automotive Engineers of Japan, Inc., 1972) (Japanese text).

K. Yoshida & T. Kamiya, "Stability and Steering Response in Two–Wheeled Vehicle," Journal of the Society of Automotive Engineers of Japan, Inc., vol. 26, pp. 866–872 (Tokyo, Society of Automotive Engineers of Japan, Inc., 1972) (English–language translation).

(List continued on next page.)

Primary Examiner—Steven D. Maki
(74) Attorney, Agent, or Firm—Finnegan, Henderson, Farabow, Garrett & Dunner, L.L.P.

(57) ABSTRACT

A very high performance tire (1, 101) for vehicles comprises a tread (14) provided with a plurality of transversal grooves (15) circumferentially distributed along the tread (14) in groups alternately extending from opposite shoulder zones (F, G) of the tread (14). The transversal grooves (15) define in an equatorial zone (E) of the tread (14) a substantially isotropic matrix of substantially continuous portions (18) of the tread (14) terminating at an equatorial portion (17) of a same transversal groove (15) of the axially opposite group of grooves.

36 Claims, 3 Drawing Sheets

U.S. PATENT DOCUMENTS

| | | | | | |
|---|---|---|---|---|---|
| 2,011,552 | A | * | 8/1935 | Hoover | |
| 2,415,290 | A | * | 2/1947 | Kreyer | 152/209.12 |
| 3,980,118 | A | | 9/1976 | Kinas | |
| 4,057,089 | A | * | 11/1977 | Johannsen | 152/209.28 |
| 4,726,407 | A | * | 2/1988 | Hayakawa et al. | 152/209.28 |
| 4,832,099 | A | * | 5/1989 | Matsumoto | 152/209.28 |
| 5,131,443 | A | * | 7/1992 | Kuhr et al. | 152/209.28 |
| 5,176,766 | A | * | 1/1993 | Landers et al. | 152/209.26 |
| 5,323,824 | A | | 6/1994 | Swift et al. | |
| 5,421,391 | A | * | 6/1995 | Himuro | 152/209.28 |
| 5,609,699 | A | * | 3/1997 | Himuro | 152/209.28 |
| 5,725,700 | A | * | 3/1998 | Ichiki | 152/209.28 |
| D414,731 | S | * | 10/1999 | Akiyama et al. | D12/149 |
| 6,148,886 | A | * | 11/2000 | Takasugi et al. | 152/209.28 |
| 6,206,064 | B1 | * | 3/2001 | Takahashi | 152/209.28 |

OTHER PUBLICATIONS

"Tire, Brake," Series of Automobile Engineering, No. 12, pp. 45–48 (K. Kageyama ed., Tokyo, Sankaido Publishing Co. Ltd 1980) (Japanese text).

"Tire, Brake," Series of Automobile Engineering, No. 12, pp. 45–48 (K. Kageyama ed., Tokyo, Sankaido Publishing Co. Ltd 1980) (English–language translation).

T. Takahashi et al., "Experimental and Theoretical Study of the Influence of Tires on Straight–Running Motorcycle Weave Response," SAE Technical Paper Series No. 840248, International Congress & Exposition, Detroit, Michigan, pp. 1–10 (Warrendale, PA, Society of Automotive Engineers, Inc., 1984).

* cited by examiner

HIGH PERFORMANCE TIRE FOR VEHICLES

CROSS-REFERENCE TO RELATED APPLICATIONS

This application is a continuation of International Application No. PCT/EP98/06182, filed Sep. 25, 1998, in the European Patent Office, the contents of which are relied upon and incorporated herein by reference; additionally, Applicants claim the right of priority under 35 U.S.C. §119(a)-(d) based on patent application No. 97830471.5, filed Sep. 26, 1997, in the European Patent Office; further, Applicants claim the benefit under 35 U.S.C. §119(e) based on prior-filed, copending provisional application No. 60/063,848, filed Oct. 31, 1997, in the U.S. Patent and Trademark Office.

BACKGROUND OF THE INVENTION

In its more general aspect, the present invention relates to a tire for vehicles.

More particularly, the invention relates to a very high performance tire for vehicles having a curvature ratio not greater than 0.1, the tire being preferably, however not exclusively, used in motor-vehicles capable of providing a high torque and reaching high speeds both in straight and curve.

The known tires of this type comprise:

a carcass structure including a central crown portion and two sidewalls ending in a couple of beads for anchoring to a rim of a wheel;
a belt structure, coaxially associated to the carcass structure;
a tread, coaxially extending around the belt structure, on the tread being defined:
  i) an equatorial zone extending on either side of the equatorial plane of the tire, and
  ii) two shoulder zones in axially opposite positions with respect to said equatorial zone;

said tread comprising a plurality of transversal grooves including a first shoulder portion and a second equatorial portion.

Definitions

In the following description and in the appended claims, the terms:

"groove" and "slit" are intended to indicate grooves formed on the tire tread having a width greater than and, respectively, equal to or lower than 2 mm;
"longitudinal" and "longitudinally" are intended to indicate entities measured along the circumferential development of the tire;
"axial" and "axially" are intended to indicate entities measured along the peripheral surface of the tire in a direction perpendicular with respect to the equatorial plane of the same.

Finally, in the following description and in the appended claims, the various geometrical entities will be measured with reference to the median axis of the elements present on the tread.

PRIOR ART

As is known, in the production of tires and in particular of tires of the so called very high performance type to be mounted on high-powered sports-cars, the need has always been felt of ensuring an adequate performance of the tire, in spite of the extreme stresses it has to withstand in use, particularly when the same is a sports use.

The Applicant believes that the difficulty of fully satisfying the above requirement is essentially related to the difficulty of limiting the mobility of the blocks (meaning by this term the tread portions delimited between consecutive grooves, both along the axial and along the circumferential direction) present on the tread as the blocks warm up during use.

Up to now the attempts made in the art for ensuring the desired high performance levels of the tire and based on the design of treads provided with variously inclined grooves and variously shaped blocks have not allowed to achieve entirely satisfactory results.

In fact, during the tire rolling, the blocks present on the tread are submitted to a full range of thermal-mechanical stresses, mainly due to the warming of the rubber composition caused by friction and to the compression and shear stresses which tend to bend and deform the blocks, modifying their geometry and causing a degradation of tire performances, in particular during the so-called "boundary" driving.

Besides, in the tires of the known art, a performance degradation of the same after a certain wear of the tread takes place almost always, since the thermal-mechanical stresses imparted to the blocks increasingly modify the geometry thereof which, in its turn, causes an increasingly marked deviation from the desired road behavior.

Tires having no longitudinal grooves are known in the field of motor-cycle tires, for instance as described in copending European patent applications Nos. 97 202 112.5 and 97 202 113.3, i.e. tires showing a high transverse curvature with respect to the corresponding motor-vehicle tires.

As is known, in a tire the transverse curvature is defined by the value of the ratio between the distance of the tread crown from the line passing through the tread end points as measured on the equatorial plane, also known as "camber" of the tread, and the distance between said end points of the tread. In motor-cycles tires, such ratio, indicated in the following as "curvature ratio" usually has a value not lower than 0.15. The curvature ratio of a conventional tire for motor-vehicles has a value equal to about 0.05 and in any case it is never higher than 0.1.

However, in a motor-cycle tire, the limited width of the tread and the particular curvature ratio define a ground-contacting area which is remarkably narrower than a corresponding tire for motor-vehicle. This means that the problems of wet ground grip and aquaplaning, directly related to the size of the ground-contacting area of the tread on the ground, affect the tires in a different way and are therefore solved in a different way according to the type of tire concerned.

In particular, the Applicant has sensed that a tread pattern for motor-cycles, optimized to solve the specific problems of this type of tire (for instance, the excessive wear of the equatorial zone of the tread), but not other much less felt problems (for instance, water draining off), can be adopted as a reference to realize a tread pattern for motor-vehicles.

In fact, the Applicant has understood that the realization of a tire with a tread pattern having no longitudinal grooves might be very advantageous, and in contrast to the constant teaching of the prior art, it has surprisingly found that, by suitably modifying a tread pattern which was considered to be fit for use only in motor-cycles, it was possible to satisfy the different more specific requirements of a tire for motor-vehicles, such as for instance the grip on wet ground and aquaplaning.

SUMMARY OF THE INVENTION

The technical problem underlying the present invention is that of providing a tire having structural and functional features adapted not only to ensure an adequate performance of the tire, but also to maintain substantially constant—independently of the wear conditions of the tread—the performances of the tire in general and, in particular, grip on dry and wet ground, tractivity, side stability and noisiness.

According to a first aspect of the invention, this problem is solved by a tire of the aforementioned type, which is characterized in that said transversal grooves are circumferentially distributed along the tread in groups alternately extending from said shoulder zones of the tread, said groups of grooves defining in the equatorial zone of the tread a plurality of substantially continuous portions of the tread ending at the equatorial portion of a same transversal groove of the axially opposed group of grooves.

According to a second aspect of the invention, this problem is solved by a tread for vehicle tires, in particular a premolded tread for covering worn tires, comprising a plurality of transversal grooves including a first shoulder portion and a second equatorial portion formed in an equatorial zone of the tread extending on either side of the equatorial plane of the tire and along at least one of two adjoining shoulder zones defined in axially opposed parts with respect to said equatorial zone, which tread is characterized in that said transversal grooves are circumferentially distributed in groups alternately extending from said shoulder zone of the tread, said groups of grooves defining in the equatorial zone of the tread a plurality of substantially continuous portions of the tread terminating at the equatorial portion of a same transversal groove of the axially opposed group of grooves.

In the following description and in the appended claims, the term: "substantially continuous tread portion" is intended to indicate a portion of the tread which is not interrupted by grooves even though it is crossed by slits however oriented.

According to the invention, the Applicant has found in particular that the aforesaid groups of substantially continuous tread portions alternately extending from opposite shoulder zones towards the equatorial plane of the tire, form a sort of "grid" or "matrix" of elastomeric material portions fitted in with one another and substantially devoid of longitudinal hinge elements.

Besides, the substantially continuous tread portions constitute as many groups of "struts" adapted to discharge, along their own axis and towards the back of the substantially continuous axially opposed portions, the stresses imparted thereto during the tire rolling.

The structural stiffness resulting from the mutual fitting of the substantially continuous axially opposed tread portions, allows these portions to absorb without bending nor too much deforming themselves, all the thermal-mechanical stresses imparted thereto during the tire rolling.

Thanks to such mobility reduction of the various tread portions, it has been noticed a drastic reduction in the thermal-mechanical degradation phenomena of the elastomeric matrix of the tread also in the presence of extreme stresses.

Preferably, the equatorial zone of the tread concerned by the equatorial portion of the transversal grooves extends on either side of the equatorial plane of the tire for a portion having a width comprised between 20% and 60% of the axial development of the tread, said development being understood as a peripheral development of the tire tread mounted on the nominal rim, inflated up to the running pressure and not loaded. This development essentially coincides with the base development of the mold sector used for manufacturing the tire.

Still more preferably, such equatorial zone extends on either side of the equatorial plane of the tire for a portion having a width comprised between 25% and 55% of the axial development of the tread.

Alternatively, said equatorial zone extends on either side of the equatorial plane of the tire for a portion having a width comprised between the planes passing through the points of the equatorial portions of the transversal grooves that are axially farthest with respect to the respective shoulder zone from which they extend.

In the following description and in the appended claims, the term: "substantially rectilinear element" is intended to indicate either a geometrically rectilinear portion (a segment of a straight line), for instance of a groove or of elastomeric material, or a portion however curvilinear such that the development of the portion does not exceed more than 10% of the straight distance between the start and the end points of said portion.

Preferably, to evaluate if an element extending within the equatorial zone is substantially rectilinear according to such definition, the segment that links the intersection point of the element with one of said circumferential planes defining the equatorial zone and the axially farthest point of the element with respect to said plane, is identified. The length of such segment is then compared with the straight distance that links said points.

In the presence of elements not substantially rectilinear, which do not allow to measure angular values, such measurement is carried out with reference to the straight segment which links the points of the element not substantially rectilinear which are axially farthest within the equatorial zone.

Besides, the transversal grooves preferably impart to the tread pattern a directional characteristic, i.e. they identify a preferred rolling direction of the tire.

In any case, the invention may also be realized with regard to non-directional tread patterns (either symmetric or asymmetric) wherein said preferred rolling direction is not present.

Preferably, the equatorial portion of at least one transversal groove forms an angle ($\gamma$) with respect to the equatorial plane of the tire comprised between 20° and 65° (measured both in clockwise and counterclockwise direction, starting from the equatorial plane, according to the inclination of the transversal grooves) and, still more preferably, between 30° and 50°.

Still more preferably, the equatorial portion of at least one transversal groove forms an angle ($\alpha$) of a width comprised between 40° and 130° and, still more preferably, between 60° and 100°, with respect to the equatorial portion of a groove of the axially opposed group and extending from the opposite shoulder zone of the tire.

Preferably, such angular values are constant within the equatorial zone, to the advantage of the symmetry and isotropy of the matrix of substantially continuous portions of rubber thus defined on the tread.

Tests carried out by the Applicant have surprisingly shown that the aquaplaning behavior of the tire is not significantly affected—within the aforesaid interval of preferred inclination values—by the inclination of the transversal grooves which can effectively drain off the water collected under the ground-contacting area, independently of the value taken up by said angle ($\gamma$) within said range.

In a preferred embodiment of the invention, the equatorial portion of the transversal grooves of the tires, in particular those to be mounted on the front wheel of a vehicle, forms an angle ($\gamma$) with respect to the equatorial plane of the tire substantially equal to 45°, so as to be substantially perpendicular ($\alpha$=about 90°) to the equatorial portion of the grooves of the axially opposed group extending from the opposite shoulder zone of the tire.

In this way, it has advantageously been found an optimum symmetry and isotropy of the matrix of substantially continuous portions of the rubber composition thus defined on the tread, so that the rubber composition reacts in an extremely homogeneous and isotropic way, in particular on the steering tire that is usually most stressed during rolling, whatever the direction of the stress the tire has to withstand and without negatively affecting wet road performances.

With such symmetric configuration of the tread pattern, it has in particular been noticed a so-called "neutral" behavior of the tire to the various stresses with the absence of any preferred releasing direction of the latter.

Further important and advantageous effects obtainable thanks to the particular arrangement of the transversal grooves with the formation of a substantially isotropic matrix of portion of elastomeric material fitted into one another include:

a) the achievement of a better wear regularity, that can also be associated to some extent to the stiffness increase of the substantially continuous tread portions, since the tread reacts in the same way whatever the direction of the stress the tire has to withstand; and b) the possibility of using softer rubber compositions while maintaining the same abradibility values, to the advantage of rolling noiselessness and comfort.

In a further embodiment of the invention, the equatorial portion of at least one transversal groove of the tires, in particular those to be mounted on the rear wheel of a vehicle, preferably forms an angle ($\gamma$) substantially equal to 30° ($\alpha$=60°) with respect to the equatorial plane of the tire.

In this way, it has advantageously been achieved the highest performances of the rear tire tread along the direction of greatest stress (traction/braking) during the vehicle's rolling.

Preferably, at least one of the transversal grooves comprises an equatorial portion extending on either side of the equatorial plane of the tire. In this way, it has been found an optimum aquaplaning behavior of the tire, even in the absence of longitudinal grooves usually adopted in car tires according to the prior art.

Preferably, at least one of the transversal grooves comprises an equatorial portion extending in a substantially rectilinear way within an equatorial half-zone of the tread, meaning by this term the portion comprised between the equatorial axis and the starting point of one of the shoulder portions of the tread itself.

According to an alternative embodiment of the invention, wherein the equatorial zone of the tread has a limited width (for instance comprised between 35% and 45% of its axial development defined above), at least one of the transversal grooves comprises an equatorial portion extending in a substantially rectilinear way at least in part within one of the shoulder zones of the tire tread.

Preferably, in each group of grooves, the grooves have a length that decreases along the rolling direction of the tire, and comprise equatorial portions at least in part substantially parallel to one another, to the advantage of the symmetry and isotropy of the equatorial zone of the tread.

Preferably, the equatorial portions of the transversal grooves terminate at a prefixed distance from the equatorial portion of a same transversal groove, still more preferably of the transversal groove having a prevailing length of the axially opposed group of grooves. Preferably, such distance is comprised between 0 mm and 50% of the mean pitch of the tread pattern and, still more preferably, it is at least equal to 4 mm.

In the following description and the in appended claims, the term: "mean pitch" of the tread pattern is intended to indicate the arithmetic mean of the distances between consecutive transversal grooves, measured along the circumferential development of the tread.

Preferably, the transversal grooves comprise two substantially rectilinear portions extending along the equatorial zone and, respectively, the shoulder zone of the tire, connected by means of a substantially curvilinear intermediate length having a curvature radius comprised between 30 and 60 mm.

Such curvature radius varies according to the chord of the tire and may be easily selected in such range of values by those skilled in the art.

Preferably, the shoulder portion of the transversal grooves forms with the equatorial plane of the tire an angle ($\beta$) of a width comprised between 85° and 95° and, still more preferably, equal to about 90°.

In a preferred embodiment, the equatorial portions and at least a part of the shoulder portion of the transversal grooves have a substantially constant width along the tread portion that substantially corresponds to the ground-contacting area of the tire along straight stretches.

In this way, the drain off of water present under the ground-contacting area of the tire is advantageously increased, with a reduction of aquaplaning phenomena Preferably, the width of the equatorial portions and of at least a part of the shoulder portion of the transversal grooves is comprised between 5 and 10 mm.

The optimum width value may be easily selected within such range by those skilled in the art, according to the specific pitch of the grooves comprised in a given group, meaning by this term the distance, measured along the circumferential development of the tread, between two consecutive transversal grooves.

In a preferred embodiment of the invention, the width of the equatorial portions and of at least a part of the shoulder portion of the transversal grooves is comprised between 6 and 8 mm.

In this way, an optimum balancing has been found between the noisiness reduction and tire performance on wet ground.

In a further embodiment of the invention, the shoulder portion of the transversal grooves comprises at one end a constriction or end portion having a reduced width with respect to the remaining part of the same.

Preferably, such end portion has a width comprised between 40% and 60%, and preferably about 50%, of the maximum width of the transversal grooves, and allows to achieve the following advantages:

1) an improvement of road holding in curves and extreme driving conditions, such as for instance those associated to the sports use of the tires on high-performance vehicles, thanks to the greater stiffness of the tread portions included in the shoulder zones and to the greater solid area under the ground-contacting area in curves;

2) a drastic limitation of the so-called "saw-tooth" irregular wear phenomena of said portions included in the shoulder zones, thanks to the reduction in wear non-uniformity between the leading and trailing edges of the grooves having a reduced width.

Preferably, such portion is located outside of the ground contacting-area of the tire along straight stretches, so as not to hinder a regular water draining from the equatorial zone of the tread towards the outside, while it falls within the ground-contacting area in curves or drift rolling, allowing to achieve the aforementioned improvement.

In a preferred embodiment of the invention, there is an odd number of grooves in each of the above groups, to improve symmetry and isotropy of the tread pattern.

Preferably, each of the groups of grooves formed in the tread comprises from 3 to 7 and, still more preferably, from 3 to 5 transversal grooves.

In an embodiment of the invention, the front and rear tires have the same chord: in this case, the tread of the front tire is provided with groups preferably comprising three transversal grooves, while the tread of the rear tire is provided with groups preferably comprising five transversal grooves.

In an alternative embodiment, the rear tire has a chord greater than the chord of the front tire: in this case, the tread of both tires is provided with groups preferably comprising five transversal grooves.

Preferably, the transversal grooves have a depth comprised between 5 and 9 mm and, still more preferably, between 6.5 and 8.5 mm, independently of their number and of the tire size.

In a preferred embodiment, the transversal grooves of each of said groups are longitudinally staggered with respect to the grooves of the axially opposed group by a length equal to 50% of the mean pitch of the tread pattern.

In this way, it has been found an advantageous reduction of the tire noisiness, which has also been optimized thanks to the tread pattern having a special conformation by groups of grooves.

In fact, in the tires of the invention it is possible to reduce the overall noisiness of the tread pattern operating in two ways, namely by regulating either the pitch value between individual adjoining grooves or the pitch value between groups of consecutive grooves, meaning by this term the distance, measured along the circumferential development of the tread, between corresponding transversal grooves (for instance, those of greatest length) of consecutive groups of grooves.

Therefore, the pitch between consecutive groups of grooves corresponds to "n" times the pitch between individual grooves, wherein "n" is the number of grooves comprised in each group.

In the tires of the invention it is therefore possible to reduce not only the noisiness corresponding to the wavelengths between the $50^{th}$ and the $70^{th}$ harmonic (meaning by $1^{st}$ harmonic that of the wheel turn) which are a function of the pitch between the individual grooves, but also the noisiness—the optimization of which proves to be very difficult—corresponding for instance to the wavelengths between the $10^{th}$ and the $25^{th}$ harmonic, which, instead, is a function of the pitch between the groups of grooves.

Advantageously, by changing the number of the transversal grooves comprised in each group, it is also possible to have a more or less high number of groups to be circumferentially distributed along the tread pattern, obtaining in this way a high design flexibility of the pitch sequence, to achieve the lowest overall noisiness.

So, for instance, it is possible to optimize—if desired—the noisiness corresponding to the wavelengths between the $10^{th}$ and the $14^{th}$ harmonic by using groups comprising five transversal grooves, or to optimize the noisiness corresponding to the wavelengths between the $16^{th}$ and the $23^{rd}$ harmonic by using groups comprising three transversal grooves. Besides, in the latter case, the greater number of groups of grooves allows a greater design freedom to optimize the acoustic result.

In a further embodiment of the invention, the tire tread may possibly comprise a central depression preferably formed astride the equatorial plane of the tire and, still more preferably, circumferentially extending without interruptions.

This feature is particularly advantageous since it allows to keep substantially unchanged the reaction of the tread pattern to the different stress conditions, so that the groups of "struts" will continue to release the stresses along their own axis and towards the back of the essentially continuous axially opposite portions.

In fact, by considering simply the aspect of an improvement of wet road behavior, such central depression might be adequately replaced by a longitudinal groove. However, such a groove would interrupt the isotropy of the pattern, concentrating against the wall of said groove the release of the stresses and reducing in this way the advantages of the substantially isotropic matrix synergistically defined by the groups of struts.

Preferably, said central depression has a flared substantially V-shaped transversal section and has a variable depth, which increases towards the equatorial plane of the tire wherein it reaches its maximum value, which is comprised between 40% and 60% of the transversal grooves depth. Besides, the central depression has a width preferably comprised between 15 and 25 mm.

In this way, it has been noticed an advantageous improvement in wet road behavior, with a reduction of aquaplaning phenomena.

Preferably, the tire tread according to the invention further comprises a couple of longitudinal slots or "disconnection grooves", extending from opposite parts of the equatorial plane of the tire on said shoulder zones.

Preferably, furthermore, the longitudinal slots extend substantially throughout the whole circumferential development of the tread.

Advantageously, said slots contribute to impart to the tread an adequate flexibility at the shoulder zones of the tire, recovering their curvature effect and increasing the ground-contacting area.

In a preferred embodiment, said longitudinal slots have a depth equal to or lower than 2 mm.

Preferably, the tire according to the invention further comprises a couple of longitudinal continuous slits circumferentially extending in the shoulder zone and on eother side of the equatorial plane of the tire.

Advantageously, said slits contribute to reduce the noisiness of the tire, and to increase the ground-contacting area of the tire, recovering their curvature effect and increasing road holding on wet ground.

In a preferred embodiment, the longitudinal slits comprise a plurality of adjoining portions, circumferentially extending without interruption, each having a variable depth comprised between 1 and 9 mm and a width not greater than 2 mm.

Preferably, the tire according to the invention further comprises a plurality of longitudinal slits of a prefixed length, circumferentially extending in their own equatorial zone and on either side of the equatorial plane of the tire.

Additional slits, also having a prefixed length, span in the equatorial zone at the equatorial plane of the tire along which they are distributed according to a variable pitch.

Advantageously, said slits contribute, on the one hand, to reduce the noisiness of the tire and, on the other hand, to improve road holding on wet ground and the plastic and acoustic comfort during rolling, besides ensuring a more uniform wear regularity of the rubber.

Such slits may be perpendicular, parallel or anyhow inclined with respect to the transversal grooves and preferably have a width comprised between 1 and 2 mm.

Preferably, furthermore, the slits have a depth variable in a direction opposite to the rolling direction of the tire and comprised between 1 and 9 mm.

Advantageously, the variable depth of said slits contributes to obtain a more regular and uniform wear of the tread.

Preferably, the tire of the invention further comprises a plurality of transversal notches formed in said shoulder zones of the tread and located between adjoining transversal grooves.

Advantageously, said notches contribute both to reduce the noisiness of the tire by distributing the noise caused during rolling throughout the whole range of the audible frequencies, and to increase the curve traction characteristics of the tire.

In a preferred embodiment, said notches have a depth comprised between 3 and 4.5 nm and a width comprised between 2 and 3.5 mm; preferably, furthermore, said notches extend from the axially outer edge of the tread pattern up to the corresponding continuous longitudinally slit.

According to a third aspect, the invention also relates to a set of tires comprising a first couple of tires adapted to be mounted on the front wheels of a vehicle and a second couple of tires adapted to be mounted on the rear wheels of a vehicle, said first and second couple of tires comprising a first and respectively a second tread on each of which are defined:

i) an equatorial zone extending on either side of the equatorial plane of the tire, and ii) two shoulder zones in axially opposite positions with respect to said equatorial zone;

said first and second treads being provided with a plurality of transversal grooves including a first shoulder portion and a second equatorial portion, which set is characterized in that:

1) in the front tires said transversal grooves are circumferentially distributed along the first tread in groups alternately extending from opposite shoulder zones of the tread, each of said groups including from three to five grooves, 2) in the rear tires said transversal grooves are circumferentially distributed along the second tread in groups alternately extending from opposite shoulder zones of the tread, each of said groups including from five to seven grooves, said groups of grooves defining in the equatorial zone of said first and second treads a corresponding plurality of substantially continuous portions of the tread terminating at the equatorial portion of a same transversal groove of the axially opposite group of grooves.

In an embodiment of the invention, the front and rear tires have the same chord: in this case, the tread of the front tire is provided with groups preferably comprising three transversal grooves, while the tread of the rear tire is provided with groups preferably comprising five transversal grooves.

In an alternative embodiment, the rear tire has a chord greater than the chord of the front tire: in this case, the tread of both tires is provided with groups preferably comprising five transversal grooves.

In a preferred embodiment of the invention and as described above, the transversal grooves of the tires may form angles ($\alpha$), with respect to the equatorial portion of the grooves of the axially opposed group, which could be different in the front and the rear tires: in this case, such an angle is substantially equal to 90° in the tires of the front couple (steering tires) and substantially equal to 60° in the tires of the rear couple.

Preferably, the tread of the front tire further comprises the central depression formed astride the equatorial plane of the above described tire, so as to improve wet ground behavior and in particular to reduce aquaplaning phenomena.

In a further embodiment of the invention, in one or both the front and rear tires, the shoulder portion of the transversal grooves comprises at one end a constriction or end portion having a reduced width with respect to the remaining part of the same.

Preferably, said end portion has a width comprised between 40% and 60%, preferably about 50%, of the width of the transversal grooves and allows to achieve the advantages described hereinabove.

In testing the tires of the invention on a sports-car, the Applicant has found that, contrary to all expectations, the best results on dry ground were achieved by mounting on the front steering axis of the car a couple of tires having a tread pattern showing directional characteristics less marked with respect to the tread pattern of the tires mounted on the rear tractive axis. Still more surprisingly, it has been found that, during the tests on wet ground, the inversion of the tread patterns between the front and the rear tires did not substantially modify the performances of the car.

To evaluate the directionality characteristics of a tire it is sufficient to mount the tire with a rolling direction opposite to the preferred one and to record the performances degradation. Generally, higher directional characteristics correspond to tread patterns having transversal grooves which form angles having smaller values with respect to the equatorial plane.

According to a fourth aspect, the invention relates to a method of optimizing the road behavior of a vehicle equipped with a set of tires, comprising the following steps:

a) mounting on the front steering axis of the vehicle a couple of tires comprising a first tread allowing a substantially neutral behavior to lateral and longitudinal stresses and combinations thereof;

b) mounting on the rear tractive axis of the vehicle a couple of tires comprising a second tread having a preferred releasing direction of longitudinal stresses with respect to lateral stresses.

The Applicant believes that this performance increase is due to the fact that the tires mounted on the front axis of the vehicle undergo to greater lateral stresses with respect to the rear tires upon entering a curve, since they must transmit the vehicle change of direction, while the rear tractive tires undergo to greater longitudinal stresses to discharge down to the ground the torque transmitted by the engine.

Therefore, it is convenient to adopt on the front tire a neutral pattern that does not hamper the behavior to side thrusts to the advantage of longitudinal thrusts. In its turn, the rear tire may be advantageously specialized to improve its response to the stresses it is prevailingly submitted to.

Advantageously, the front tires may be provided with a depression improving the performances on wet ground, without modifying the grid or matrix of grooves and struts, therefore maintaining the neutral behavior of the tire associated to the maximum pattern isotropy.

SHORT DESCRIPTION OF THE FIGURES

Further characteristics and advantages will be more clearly apparent by the following description of a preferred embodiment of a tire according to the invention, solely included by way of indicative and non limiting example, with reference to the attached drawings.

DETAILED DESCRIPTION OF THE PREFERRED EMBODIMENTS

Figure 1:
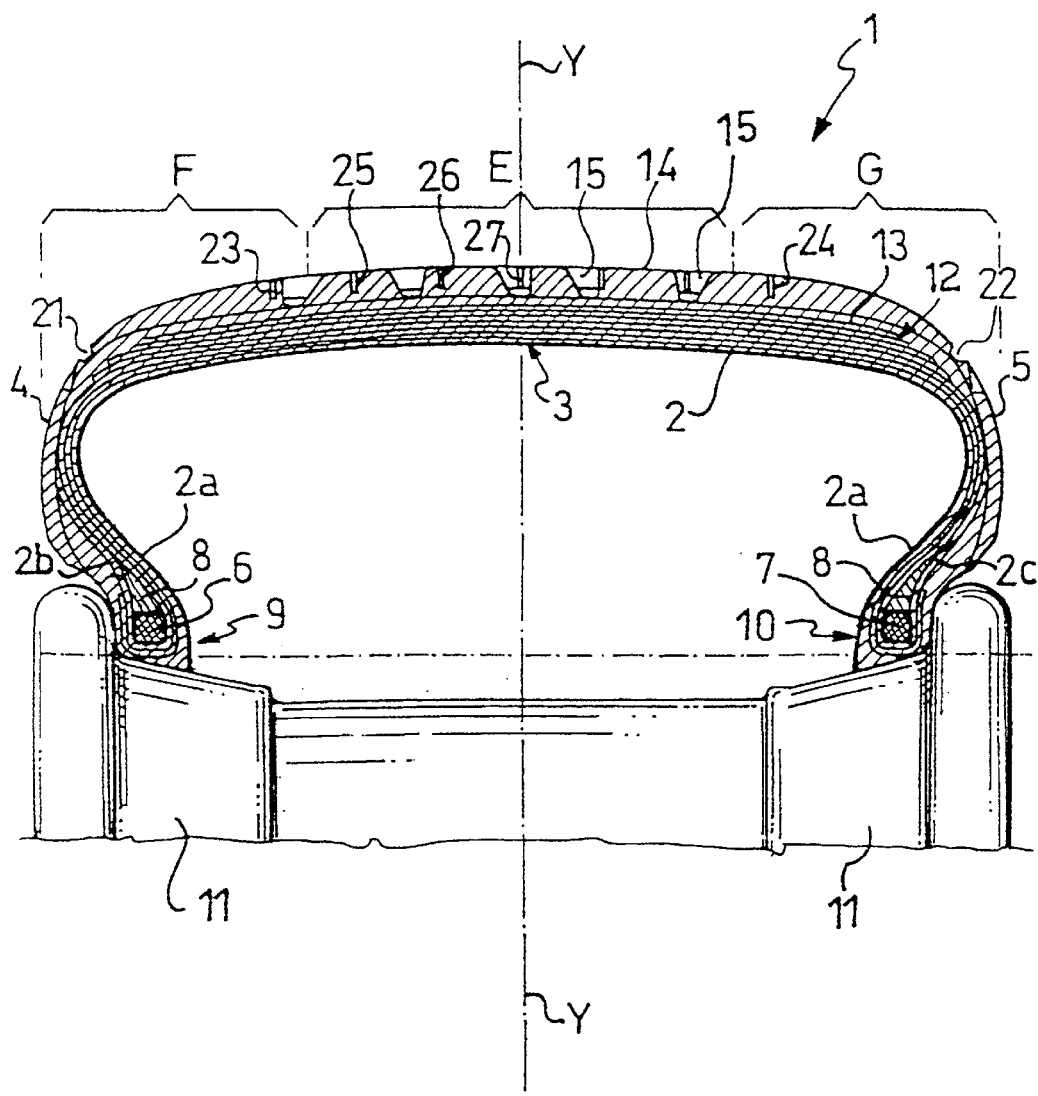
FIG. 1 shows a cross section view of a tire according to the invention, in particular a tire to be mounted on the rear wheel of a vehicle, taken along the line I—I of FIG. 2.
Figure 2:
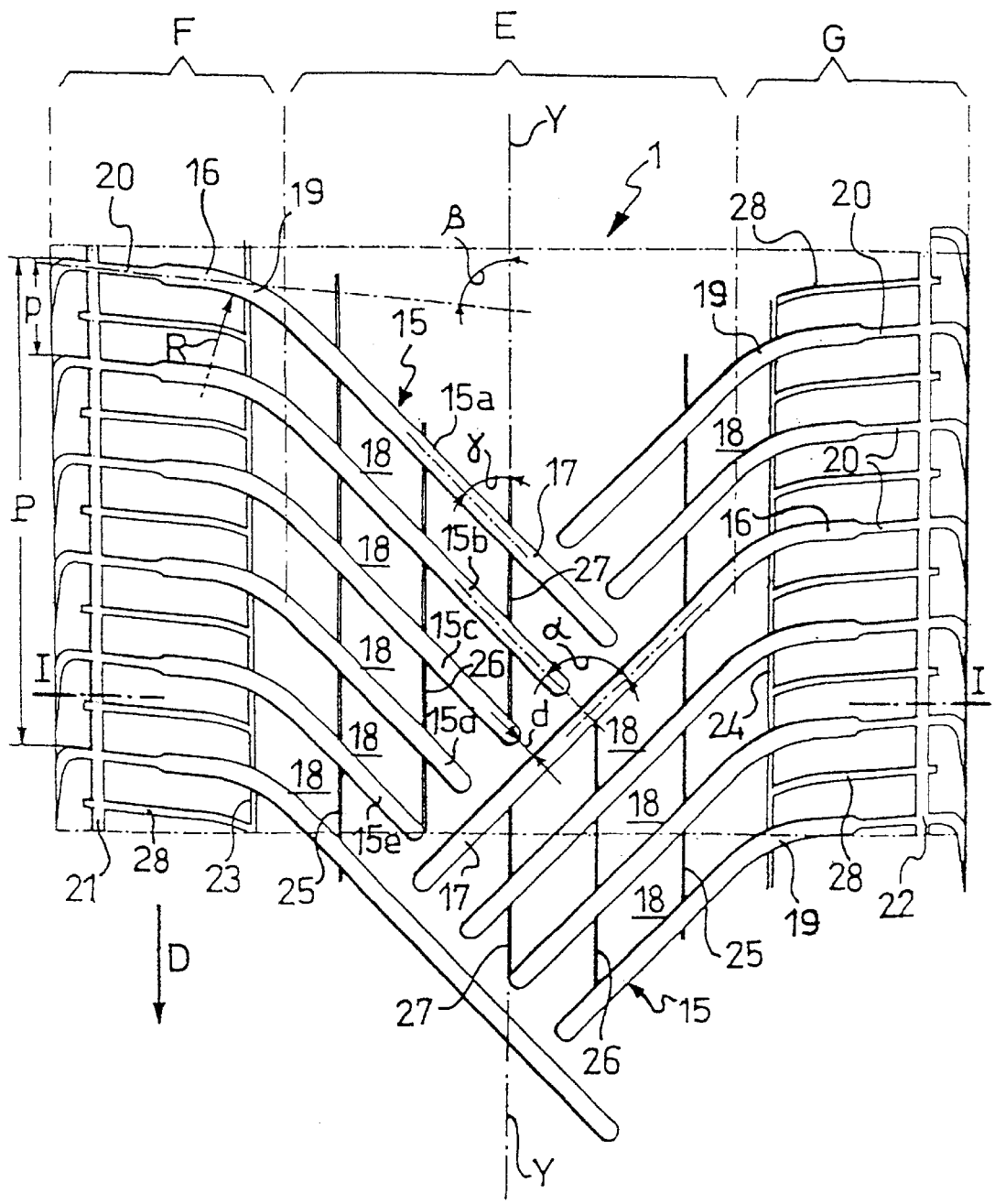
FIG. 2 shows a plan development of the tire tread of FIG. 1.

With reference to FIGS. 1 and 2, the numeral 1 globally indicates a very high performance tire for vehicles according to the invention, in particular a tire to be mounted on the rear wheel of a motor-vehicle and having a chord greater than 135 mm and, preferably, comprised between 215 and 365 mm.

Solely for the sake of simplifying the present description, in the following a tire will be described the tread pattern of which has only one pitch.

The tire 1 comprises a carcass structure 2, including a central crown portion 3 and two sidewalls 4, 5, provided with a reinforcing ply 2a the opposite side edges of which 2b, 2c are turned around respective bead cores 6, 7.

On the peripheral outer edge of the bead cores 6, 7, located at the radially inner end of said sidewalls 4, 5 an elastomeric filling 8 is applied which fills the space defined between the reinforcing ply 2a and the respective side edges 2b, 2c of the reinforcing ply 2a.

As is known, the opposite zones of the tire 1 comprising each bead cores 6, 7 and the filling 8 form the so-called beads, globally indicated by 9 and 10, intended for anchoring the tire 1 onto a corresponding mounting rim 11 of a vehicle wheel.

A belt structure 12 comprising one or more belt strips 13, including textile or metal cords incorporated in a plurality of rubber layers, is coaxially associated to said carcass structure 2.

In a known manner, a tread 14 by means of which the tire 1 gets in touch with the ground is applied on the belt structure 12.

The tread 14 comprises a plurality of transversal grooves 15 including a first portion 16 prevailingly extending in a shoulder zone thereof (in the following: shoulder portion) and substantially perpendicular to the equatorial plane Y-Y of the tire, and a second portion 17 prevailingly extending in an equatorial zone E (in the following: equatorial portion).

Said equatorial zone E of the tread 14 extends on either side of the equatorial plane Y-Y for a portion having a width equal to about 40% of the axial development of said tread 14.

In the example of FIG. 2, reference is made to a tread pattern for a tire 1 having a 265/35-R18 size and having a peripheral development along the axial direction equal to 305 mm.

The transversal grooves 15 are circumferentially distributed according to a pitch "p" in groups alternately extending from opposite shoulder zones F, G of the tread 14, and distributed according to a pitch "P" along the circumferential development of said tread.

In the example shown, each of such groups include five grooves 15a–15e, parallel to one another, having a decreasing length along the rolling direction of the tire, indicated by arrow D in FIG. 2.

The transversal grooves 15a, 15b—having a greater length—extend on either side of the equatorial plane Y-Y of tire 1, while all the grooves 15a–15d of each group terminate at a prefixed distance "d" from the equatorial portion 17 of the transversal groove 15a having a prevailing length of the axially opposite group of grooves.

In the embodiment shown, the equatorial portions 17 of the transversal grooves 15 extend in a substantially rectilinear way within an equatorial half-zone E/2 of the tread 14.

In this way, the transversal grooves 15 impart to the pattern of the tread 14 a directional characteristics, i.e. they identify direction "D" as the preferred rolling direction of the tire 1.

Each of said groups of grooves 15a–15e defines in the equatorial zone E of the tread 14 a corresponding plurality of substantially continuous portions 18 of the same, having a length that decreases along the rolling direction D of the tire 1 and terminating at the equatorial portion 17 of the transversal groove 15a having a prevailing length of the axially opposite group of grooves.

Advantageously, the substantially continuous portions 18 so defined in the tread 14 constitute as many groups of "struts" adapted to discharge the stresses along their own axis and towards the back of the portion 18 of prevailing length of the axially opposite group of portions.

In the embodiment shown, the transversal grooves 15 form an angle ($\gamma$) with respect to the equatorial plane of the tire equal to about 45° (measured both in clockwise and counterclockwise direction starting from the equatorial plane Y-Y depending on the inclination of the transversal grooves 15).

In this way, the transversal grooves 15 form an angle ($\alpha$) having a width substantially equal to 90° with respect to the grooves 15 of the axially consecutive group, and extending from the opposite shoulder zone of the tire 1.

Advantageously, such angular values are constant throughout the whole axial development of the equatorial portion 17 of the transversal grooves 15, to the advantage of the symmetry and isotropy of the matrix of substantially continuous portions 18 of rubber composition thus defined in the tread 14.

In the embodiment shown, the equatorial portions 17 of each group of grooves terminate at a distance "d"—measured perpendicularly to the longitudinal axis of the transversal grooves 15—equal to about 6 mm from the equatorial portion 17 of the transversal groove 15a having a prevailing length of the axially opposite group of grooves.

The equatorial and shoulder portions 17, 16 of the transversal grooves 15 are mutually connected by an intermediate substantially curvilinear portion 19 having a curvature radius "R" equal to about 40 mm.

Besides, the shoulder portion 16 of the transversal grooves 15 forms with the equatorial plane Y-Y of the tire 1 an angle ($\beta$) equal to about 85°.

In the embodiment shown, the equatorial portion 17 of the transversal grooves 15 has a substantially constant width throughout its length equal to about 8 mm.

Instead, the shoulder portion 16 of the transversal grooves 15 comprises a first portion having a width equal to about 8 mm and a second portion having a reduced width or constriction 20 having a substantially halved width (4 mm).

The transversal grooves 15 of each of said groups have a constant depth equal to about 8 mm and are longitudinally staggered with respect to the grooves 15 of the axially opposite group by a portion equal to about 50% of the mean pitch of two consecutive groups of grooves 15.

Conveniently, the tread 14 of the tire 1 further comprises a couple of longitudinal slots 21, 22 or "disconnection grooves", circumferentially extending on opposite parts of the equatorial plane Y-Y of the tire 1 along said shoulder zones F, G. As is known, said slots do no affect the water draining characteristics of the tread pattern.

In the embodiment shown, slots 21, 22 substantially extend throughout the whole circumferential development of the tire 1 and have a depth equal to about 2 mm.

Conveniently, the tire 1 further comprises a couple of longitudinal slits 23, 24 in the equatorial zone E of the tread 14 on either side of the equatorial plane Y-Y of the tire 1.

In the embodiment shown, the longitudinal slits 23, 24 substantially extend throughout the whole circumferential development of the tire 1 and comprise a plurality of adjoining portions each having a depth ranging from 3 to 7 mm along a direction opposite with respect to the rolling direction of the tire 1, and a width equal to about 1.5 mm.

Conveniently, the tire 1 further comprises additional longitudinal slits, indicated by the numerals 25–26, having a prefixed length and circumferentially extending in the equatorial zone E of the tread 14 on either side of the equatorial plane Y-Y of the tire 1.

Further longitudinal slits 27, also having a prefixed length, are circumferentially positioned in the equatorial zone E of the tread 14 at the equatorial plane Y-Y of the tire 1, along which they are distributed according to a variable pitch.

In the embodiment shown, the longitudinal slits 25–27 are parallel to the equatorial plane Y-Y of the tire 1, have a width equal to about 1 mm and a depth variable between 3 and 7 mm along a direction opposite to the rolling direction D of the tire 1.

Besides, such slits 25–27 have a length progressively decreasing as one approaches the equatorial plane Y-Y of the tire 1: thus, the axially outermost slits 25 have a length such as to cross up to seven transversal grooves 15 also of longitudinally consecutive groups, the intermediate slits 26 have a length such as to cross or touch up to four transversal grooves 15 and the equatorial slits 27 have a length such as to cross or touch up to three transversal grooves 15.

Conveniently, the tire 1 further comprises a plurality of transversal notches 28 formed in the shoulder zones F, G of the tread 14 and interposed between consecutive transversal grooves 15.

In the embodiment shown, the notches 28 have a depth equal to about 4 mm and a width equal to about 3 mm and are axially extending for a length comprised between the slots 21 and 22 and the respective longitudinal slits 23 and 24.

Figure 3:
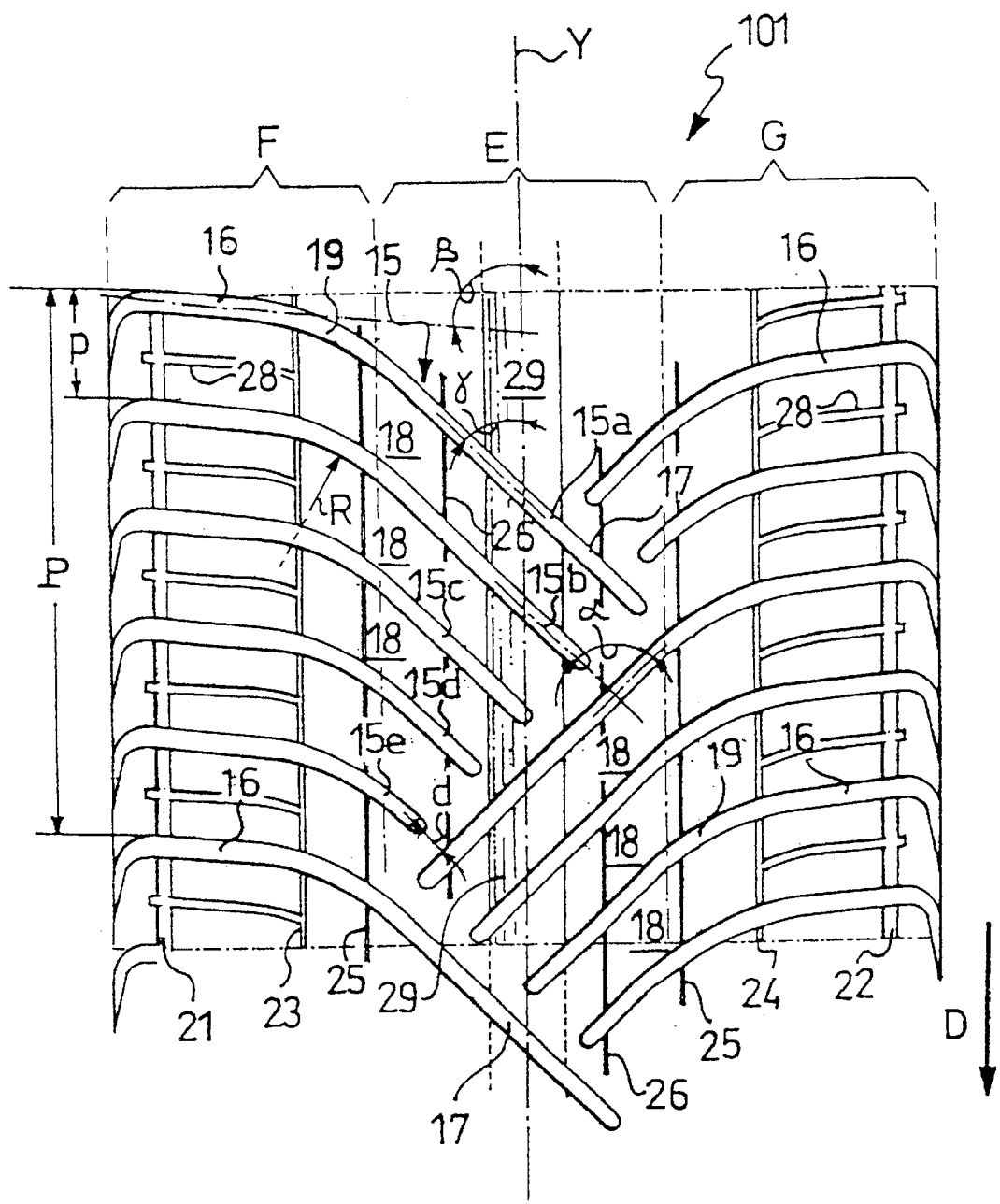
FIG. 3 shows a plan development of the tread of a second embodiment of the tire according to the invention, in particular a tire to be mounted on the front wheel of a vehicle.

FIG. 3 shows a further embodiment of the invention and in particular a very high performance tire 101 to be mounted on the front wheel of a vehicle. Also in this case, the tire 101 has a chord greater than 135 mm and preferably comprised between 215 and 365 mm.

In the following description and in said figure, the elements of the tire 101 structurally or functionally equivalent to those previously illustrated with reference to the tire 1 shown in FIGS. 1 and 2, are indicated by the same reference numerals and they will not be further described.

In the embodiment shown in FIG. 3, the shoulder portions 16 of the transversal grooves 15 have a constant width, i.e. they do not have the constriction 20, while the tread 14 of the tire 101 comprises a central depression 29, having a flared, substantially V-shaped cross-section, formed astride the equatorial plane Y-Y wherein it reaches the maximum depth equal to about 5 mm and a width equal to about 20 mm.

In this example, the central depression 29 has a flared section shaped as a round tipped wedge, but may be accomplished also in different shapes, for instance a parabolic one. In any case, the central depression 29 does not modify the way in which the groups of struts discharge among one another the stresses they are submitted to, for instance, by avoiding to set up one or more elements on which the stresses acting on the pattern may be preferably discharged.

Besides, differently from the tire 1 of the preceding embodiment, the tread 14 is provided with equatorial slits 27.

Repeated tests carried out by the Applicant have shown that the tires according to the invention entirely solve the problem of ensuring the high performances desired of the tire even in the presence of very high stresses ensuing from a boundary sports-driving.

In the following examples, reported solely by way of non limiting indication, shall be now illustrated some of the comparative tests to which the tires according to the invention and conventional tires provided with treads having blocks in the equatorial zone have been submitted.

EXAMPLE 1

Behavior on Wet Ground

The tests were carried out using a set of tires according to the invention, having the following sizes:

front tires 225/40-R18 rear tires 265/35-R18 and wherein the tread 14 respectively had transversal grooves 15 forming an angle (α) equal to about 90° (front tire) and equal to about 60° (rear tire) with respect to the grooves 15 of the axially opposite group.

Said tires were submitted to several standard comparative tests with tires available on the market having the same sizes and intended for the same type of use in order to evaluate their behavior on wet ground.

The tires used for comparison were Bridgestone S-02 and Michelin Pilot SX-MXX3.

The test conditions were:

| | |
|---|---|
| test car: | PORSCHE 911 |
| pressure of front/rear tires: | 2.5/3.0 bar |
| load: | car weight + two people |
| size of front/rear wheel rim: | 8J/10J |

At the end of each test test-drivers assigned to each of the evaluation parameters considered a value of three to eight.

The results so obtained, expressed as a mean of the evaluations made by two different test-drivers, are shown in Table 1.

As can be noticed from said Table, the tires of the invention provided markedly improved performances with respect to those offered by the tires of the prior art.

More particularly, a marked improvement was noticed in the characteristics of stability and curve release.

EXAMPLE 2

Evaluation of the Ground-contacting Area on Wet Ground—Aquaplaning

The tests were carried out using a set of tires according to the invention, having the size 225/40-R18 both on the front and the rear axis and wherein the tread 14 respectively had transversal grooves 15 forming an angle (α) equal to about 90° (front tire) and equal to about 60° (rear tire) with respect to the grooves 15 of the axially opposite group.

Said tires were submitted to a standard comparative test with asymmetric tires model Pirelli Pzero, currently available on the market for the same type of use, having the same sizes in order to determine the value of the ground-contacting area of the tires at different speeds, during rolling over a sheet of transparent material covered by a water veil of uniform thickness.

Such evaluation was performed by means of an opto-electronic system known per se, comprising a camera placed under the sheet controlled by a sensor adapted to sense the transit of the test vehicle on said sheet. The test conditions were:

| | |
|---|---|
| test car: | BMW Model M3 |
| pressure of front/rear tires: | 2.5/2.5 bar |
| load: | 385 kg |
| size of front/rear wheel rim: | 7.5J/7.5J |
| water veil height: | 6 mm |

From the tests carried out, it was noticed that at a transit speed equal to about 86 km/h, the ground-contacting area of the tires of the invention was about three times greater than that of the comparison tires of the prior art.

EXAMPLE 3

Evaluation of Aquanlaning Speed in Acceleration

The tests were carried out using a set of tires according to the invention, having size 225/40-R18 both on the front and on the rear axis and wherein the tread 14 respectively had transversal grooves 15 forming an angle (α) equal to about 90° (front tire) and equal to about 60° (rear tire) with respect to the grooves 15 of the axially opposite group.

Such tires were submitted to several standard comparative tests with tires of known type having the same size, presently available on the market for the same type of use, in order to evaluate the grip loss on an asphalt track flooded with a veil of water having a uniform thickness.

The comparative tires included the directional model Pirelli Pzero manufactured by the same Applicant, used as reference tire, and models Bridgestone S-02 and Continental Sport.

The test conditions (Vizzola track) were:

| | |
|---|---|
| test car: | AUDI A6 2.8 |
| pressure of front/rear tires: | 2.3/2.3 bar |
| front/rear load: | 890/565 kg |
| size of front/rear wheel rim: | 8J |
| water veil height: | 7 mm |
| ambient temperature: | 24–29° C. |

The results obtained, expressed as mean of five tests, are shown in Table II.

As can be noticed from said Table, the tires of the invention achieved improved performances with respect to those of the tires manufactured according to the prior art.

More particularly, an increase was noticed both in the speed at which the phenomena of grip loss start, and especially in the speed at which a complete loss of adherence is observed.

EXAMPLE 4

Evaluation of Noisiness

A) Pass by noise—Outer noise

The tests were carried out using a set of tires according to the invention, having the following sizes:

front tires 215/45-R18 rear tires 275/40-R18 and wherein the tread 14 respectively had transversal grooves 15 forming an angle (α) equal to about 90° (front tire) and equal to about 60° (rear tire) with respect to the grooves 15 of the axially opposite group.

Said tires were submitted to several standard comparative tests, in order to determine the overall noisiness of a test car during rolling with a turned off engine on a strip of ISO asphalt of standard length with directional microphones, as provided for by the standard ISO 362.

The comparative tires, all available on the market for the same type of use, were:

1) asymmetric Pirelli Pzero, sizes:

front tires 215/45-R18;

rear tires 275/40-R18;

2) Bridgestone Expedia S-01, sizes:

front tires 225/40-R18;

rear tires 265/40-R18.

The test conditions (Vizzola track) were:

| | |
|---|---|
| test car: | PORSCHE 911 |
| pressure of front/rear tires: | 2.5/3.0 bar |

The results obtained, expressed in decibels and standardized according to the weather conditions found during the tests (mean of 10 tests) are shown in Table III.

As can be noticed from said Table, the tires of the invention provided performances fully comparable to those provided by the most noiseless of the comparative tires (Bridgeston Expedia S-01).

B) Internal noisiness in a serni-anechoic chamber

The tests were carried out on a tire according to the invention, having size 265/35-R18, mounted on the front tires and wherein the tread 14 respectively had transversal grooves 15 forming an angle (α) equal to about 90° with respect to the grooves 15 of the axially opposite group.

Said tire was submitted to a series of standard comparative tests in a semi-anechoic chamber, in order to evaluate the internal noisiness of a test car placed on rollers.

The comparative tires, all available on the market for the same type of use, were:

1) asymmetric Pirelli Pzero;

2) Bridgestone S-02;

3) Michelin MXX3.

The test conditions were:

| | |
|---|---|
| test car: | PORSCHE 911 |
| tire pressure: | 3.0 bar |
| rim size: | 10J |
| dragging roller | |
| diameter: | 2546.5 mm |
| width: | 700 mm |
| maximum speed: | 150 km/h |
| load: | car load without driver and passengers |
| type of roller surface: | rough |

The tires were mounted on the car and the idle right hand front wheel was caused to rotate by the dragging roller up to 150 km/h.

Afterwards, the speed of the road wheel (dragging roller) was allowed to decrease, controlled by a computer, and the overall Sound Pressure Levels or S.P.L. were recorded starting from 150 km/h every 10 km/h.

The values so measured by means of a microphone placed inside the driver's cabin of the vehicle are shown in Table IV.

As can be noticed from this Table, the tires of the invention have allowed to reduce the noisiness within the driver's cabin of the test car by at least 2 dB at the maximum speed of 150 km/h with respect to the comparative tires, keeping best values substantially throughout the whole range considered of rolling speeds of the tire. Such values represent, in the specific field, a quite remarkable noisiness reduction.

A further test, repeated in the same conditions with a tire according to the invention wherein the transversal grooves 15 formed an angle ($\alpha$) equal to about 60° with respect to the grooves 15 of the axially opposite group, has allowed to record an increase in the noisiness values recorded with the preceding tire.

Obviously, those skilled in the art may introduce variants and modifications to the above described invention, in order to satisfy specific and contingent application requirements, variants and modifications which fall anyhow within the scope of protection as is defined by the appended claims.

TABLE I

| Parameter | Invention | Bridgestone S-02 | Michelin Pilot |
|---|---|---|---|
| curve stability (oversteering) | 7.5 | 6 | 5.5 |
| curve stability (understeering) | 6 | 6.5 | 5.5 |
| compliance | 7 | 6.5 | 5 |
| curve release | 7.5 | 6 | 5.5 |
| aquaplaning | 6.5 | 5 | 7 |
| grip start/end | 7 | 6.5 | 7 |

TABLE II

| | Pirelli Pzero directional | Invention | Bridgestone S-02 | Continental Sport |
|---|---|---|---|---|
| | Speed grip loss(km/h) | | | |
| start | 85.3 | 86.2 | 83.7 | 79.5 |
| end | 89.3 | 92.6 | 89 | 83 |
| | Ratio with values of comparative tires (%) | | | |
| start | 100 | 101.1 | 98.1 | 93.2 |
| end | 100 | 103.7 | 99.6 | 92.9 |

TABLE III

| Parameter | Invention | Bridgestone Expedia S-01 | Pirelli Pzero |
|---|---|---|---|
| Tire temperature (° C.) | 50.4 | 46.7 | 51.2 |
| asphalt T (° C.) | 43.1 | 40.1 | 43.2 |
| Air T (° C.) | 26.9 | 18.5 | 27.0 |
| S.P.L. (50 km/h) | 62.7 | 62.7 | 63.6 |
| S.P.L. (60 km/h) | 65.3 | 65.5 | 65.9 |
| S.P.L. (80 km/h) | 69.4 | 69.8 | 69.6 |

S.P.L. = Sound Pressure Level

TABLE IV

| | NOISINESS (dBA) | | | |
|---|---|---|---|---|
| Speed (km/h) | Invention | Asymmetric Pirelli Pzero | Bridgestone S-02 | Michelin MXX3 |
| 20 | 52.2 | 55.2 | 52.2 | 57.6 |
| 30 | 52.8 | 57.8 | 59.4 | 56.9 |
| 40 | 54.7 | 58.0 | 60.5 | 55.7 |
| 50 | 54.5 | 59.5 | 58.9 | 56.9 |
| 60 | 56.7 | 66.8 | 59.9 | 58.6 |
| 70 | 59.2 | 62.8 | 60.1 | 62.3 |
| 80 | 60.2 | 65.2 | 61.7 | 63.7 |
| 90 | 62.5 | 64.5 | 65.0 | 62.6 |
| 100 | 58.9 | 67.6 | 66.1 | 64.7 |
| 110 | 59.9 | 64.7 | 65.3 | 63.9 |
| 120 | 61.0 | 66.0 | 66.3 | 63.5 |
| 130 | 60.3 | 66.0 | 68.7 | 63.3 |
| 140 | 61.4 | 66.2 | 69.9 | 63.7 |
| 150 | 63.0 | 66.4 | 69.5 | 65.1 |

What is claimed is:

1. A tread for a four-wheeled vehicle tire, comprising:
a plurality of transversal grooves;
wherein the tire comprises a curvature ratio not greater than 0.1,
wherein the tread comprises an equatorial zone, extending on both sides of an equatorial plane of the tire, and two shoulder zones in axially-opposite positions with respect to the equatorial zone,
wherein the tread further comprises two longitudinal slots circumferentially extending on opposite sides of the equatorial plane of the tire along the shoulder zones,
wherein each transversal groove comprises an equatorial groove portion in the equatorial zone and a shoulder groove portion in one of the shoulder zones,
wherein the transversal grooves are circumferentially distributed in groups alternately extending from the axially-opposite shoulder zones,
wherein the groups of transversal grooves define a plurality of substantially-continuous tread portions in the equatorial zone,
wherein each substantially-continuous tread portion ends at an equatorial groove portion of a same transversal groove of an axially-opposed group of transversal grooves,
wherein each of the transversal grooves ends at a predetermined distance from the equatorial groove portion of a longest transversal groove of the axially-opposed group of transversal grooves so that all of the transversal grooves end within the equatorial zone,
wherein each substantially-continuous tread portion comprises a width wider than an adjacent transversal groove, and
wherein the substantially-continuous tread portions alternately extend from opposite shoulder zones towards the equatorial plane of the tire to form a substantially-continuous grid.

2. The tread of claim 1, wherein the equatorial groove portion of at least one of the transversal grooves forms a first angle comprised between 20° and 65° with respect to the equatorial plane of the tire.

3. The tread of claim 1, wherein at least one of the transversal grooves comprises an equatorial groove portion extending on both sides of the equatorial plane of the tire.

4. The tread of claim 1, wherein the equatorial groove portion of each transversal groove is connected to the shoulder groove portion by a substantially-curvilinear intermediate groove portion having a curvature radius comprised between 30 mm and 60 mm.

5. The tread of claim 1, wherein the shoulder groove portion of at least one transversal groove forms a second angle comprised between 85° and 95° with respect to the equatorial plane of the tire.

6. The tread of claim 1, wherein each of the groups of transversal grooves comprises three to seven transversal grooves.

7. The tread of claim 1, wherein each of the groups of transversal grooves comprises a plurality of transversal grooves having a length decreasing along a rolling direction of the tire.

8. The tread of claim 1, wherein each substantially-continuous tread portion ends at the equatorial groove portion of the longest transversal groove of the axially-opposed group of transversal grooves.

9. A tire for a vehicle, comprising:
a carcass structure;
a belt structure coaxially associated to the carcass structure; and
a tread coaxially extending around the belt structure;
wherein the tire comprises a curvature ratio not greater than 0.1,
wherein the carcass structure comprises a central crown portion and two sidewalls,
wherein each sidewall ends in a bead for anchoring the tire to a rim of a wheel,
wherein the tread comprises an equatorial zone, extending on both sides of an equatorial plane of the tire, and two shoulder zones in axially-opposite positions with respect to the equatorial zone,
wherein the tread further comprises two longitudinal slots circumferentially extending on opposite sides of the equatorial plane of the tire along the shoulder zones,
wherein the tread further comprises a plurality of transversal grooves,
wherein each transversal groove comprises an equatorial groove portion in the equatorial zone and a shoulder groove portion in one of the shoulder zones,
wherein the transversal grooves are circumferentially distributed in groups alternately extending from the axially-opposite shoulder zones,
wherein the groups of transversal grooves define a plurality of substantially-continuous tread portions in the equatorial zone,
wherein each substantially-continuous tread portion ends at an equatorial groove portion of a same transversal groove of an axially-opposed group of transversal grooves,
wherein each of the transversal grooves ends at a predetermined distance from the equatorial groove portion of a longest transversal groove of the axially-opposed group of transversal grooves so that all of the transversal grooves end within the equatorial zone,
wherein each substantially-continuous tread portion comprises a width wider than an adjacent transversal groove, and
wherein the substantially-continuous tread portions alternately extend from opposite shoulder zones towards the equatorial plane of the tire to form a substantially-continuous grid.

10. The tire of claim 9, wherein the equatorial groove portion of at least one of the transversal grooves forms a first angle comprised between 20° and 65° with respect to the equatorial plane of the tire.

11. The tire of claim 9, wherein at least one of the transversal grooves comprises an equatorial groove portion extending on both sides of the equatorial plane of the tire.

12. The tire of claim 9, wherein at least one of the transversal grooves comprises an equatorial groove portion extending in a substantially-rectilinear way within a portion of the equatorial zone on one side of the equatorial plane of the tire.

13. The tire of claim 12, wherein at least one of the transversal grooves comprises an equatorial groove portion extending in a substantially-rectilinear way at least partly within one of the shoulder zones.

14. The tire of claim 9, wherein in each group of transversal grooves, the transversal grooves comprise equatorial groove portions at least partly substantially parallel to one another.

15. The tire of claim 9, wherein the equatorial groove portions of the groups of transversal grooves end at a distance less than or equal to 50% of a mean pitch of a tread pattern from the equatorial groove portion of the same transversal groove of the axially-opposed group of transversal grooves.

16. The tire of claim 9, wherein the equatorial groove portion of each transversal groove is connected to the shoulder groove portion by a substantially-curvilinear intermediate groove portion having a curvature radius comprised between 30 mm and 60 mm.

17. The tire of claim 9, wherein the shoulder groove portion of at least one transversal groove forms a second angle comprised between 85° and 95° with respect to the equatorial plane of the tire.

18. The tire of claim 9, wherein the transversal grooves have a substantially-constant width comprised between 5 mm and 10 mm along a tread portion substantially corresponding to an area of the tire that contacts the ground when the vehicle travels in a straight line.

19. The tire of claim 9, wherein the shoulder groove portion of the transversal grooves comprises an end groove portion having a width comprised between 40% and 60% of a maximum width of the transversal grooves.

20. The tire of claim 19, wherein the end groove portion substantially lies within an area of the tire that contacts the ground when the vehicle travels around a curve or experiences drift rolling.

21. The tire of claim 9, wherein each of the groups of transversal grooves comprises three to seven transversal grooves.

22. The tire of claim 9, wherein the transversal grooves have a depth comprised between 5 mm and 9 mm.

23. The tire of claim 9, wherein the transversal grooves of each of the groups of transversal grooves are longitudinally staggered with respect to the transversal grooves of the axially-opposed group of transversal grooves by a distance equal to about 50% of a mean pitch of a tread pattern.

24. The tire of claim 9, further comprising a plurality of transversal notches in the shoulder zones interposed between adjacent transversal grooves;

wherein the transversal notches have a depth comprised between 3 mm and 4.5 mm, and wherein the transversal notches have a width comprised between 2 mm and 3.5 mm.

25. The tire of claim 9, wherein each of the groups of transversal grooves comprises a plurality of transversal grooves having a length decreasing along a rolling direction of the tire.

26. The tire of claim 9, wherein each substantially-continuous tread portion ends at the equatorial groove portion of the longest transversal groove of the axially-opposed group of transversal grooves.

27. A set of tires, comprising:

two tires for mounting on front wheels of a vehicle; and two tires for mounting on rear wheels of the vehicle;

wherein the tires for mounting on the front wheels each comprise a first tread, wherein the tires for mounting on the rear wheels each comprise a second tread, wherein each tire comprises a curvature ratio not greater than 0.1, wherein the first and second treads each comprise an equatorial zone, extending on both sides of an equatorial plane of a respective tire, and two shoulder zones in axially-opposite positions with respect to the equatorial zone of the respective tire, wherein the first and second treads each further comprise two longitudinal slots circumferentially extending on opposite sides of the equatorial plane of the respective tire along the shoulder zones, wherein the first and second treads each further comprise a plurality of transversal grooves, wherein, in the first and second treads, each transversal groove comprises an equatorial groove portion in an equatorial zone of the respective tire and a shoulder groove portion in one of the shoulder zones of the respective tire, wherein, in the first treads, the transversal grooves are circumferentially distributed in groups alternately extending from axially-opposite shoulder zones of the respective front tire, each group comprising three to five transversal grooves, wherein, in the second treads, the transversal grooves are circumferentially distributed in groups alternately extending from axially-opposite shoulder zones of the respective rear tire, each group comprising five to seven transversal grooves, wherein, in the first and second treads, the groups of transversal grooves define a plurality of substantially-continuous tread portions in the equatorial zone of the respective tire, wherein, in the first and second treads, each substantially-continuous tread portion ends at an equatorial groove portion of a same transversal groove of an axially-opposed group of transversal grooves of the respective tire, wherein, in the first and second treads, each of the transversal grooves ends at a predetermined distance from the equatorial groove portion of a longest transversal groove of the axially-opposed group of transversal grooves so that all of the transversal grooves end within the equatorial zone of the respective tire, and wherein, in the first and second treads, the substantially-continuous tread portions alternately extend from opposite shoulder zones towards the equatorial plane of the respective tire to form a substantially-continuous grid.

28. The set of tires of claim 27, wherein:

the equatorial groove portion of one or more of the transversal grooves of at least one of the first treads forms a third angle substantially equal to 45° with respect to the equatorial plane of the respective front tire, and the equatorial groove portion of one or more of the transversal grooves of at least one of the second treads forms a fourth angle substantially equal to 30° with respect to the equatorial plane of the respective rear tire.

29. The set of tires of claim 27, wherein the front tires have a chord shorter than a chord of the rear tires.

30. The set of tires of claim 27, wherein the first treads are provided with groups comprising three transversal grooves and the second treads are provided with groups comprising five transversal grooves.

31. The set of tires of claim 27, wherein the shoulder groove portion of the transversal grooves of at least one of the tires comprises an end groove portion having a width comprised between 40% and 60% of a maximum width of the transversal grooves of the at least one of the tires.

32. A tire for a vehicle, comprising:

a carcass structure;

a belt structure coaxially associated to the carcass structure; and a tread coaxially extending around the belt structure;

wherein the tire comprises a curvature ratio not greater than 0.1, wherein the carcass structure comprises a central crown portion and two sidewalls, wherein each sidewall ends in a bead for anchoring the tire to a rim of a wheel, wherein the tread comprises an equatorial zone, extending on both sides of an equatorial plane of the tire, and two shoulder zones in axially-opposite positions with respect to the equatorial zone, wherein the tread further comprises a plurality of transversal grooves, wherein each transversal groove comprises an equatorial groove portion in the equatorial zone and a shoulder groove portion in one of the shoulder zones, wherein the transversal grooves are circumferentially distributed in groups alternately extending from the axially-opposite shoulder zones, wherein the groups of transversal grooves define a plurality of substantially-continuous tread portions in the equatorial zone, wherein each of the transversal grooves ends at a predetermined distance from the equatorial groove portion of a longest transversal groove of the axially-opposed group of transversal grooves so that all of the transversal grooves end within the equatorial zone, wherein the substantially-continuous tread portions alternately extend from opposite shoulder zones towards the equatorial plane of the tire to form a substantially-continuous grid, wherein the tread further comprises a central depression formed astride the equatorial plane of the tire, wherein the central depression comprises a maximum depth comprised between 40% and 60% of a depth of the transversal grooves, and wherein the central depression comprises a width greater than or equal to 15 mm and less than or equal to 25 mm.

33. A tread for a vehicle tire, comprising:

a plurality of transversal grooves;

wherein the tire comprises a curvature ratio not greater than 0.1, wherein the tread comprises an equatorial zone, extending on both sides of an equatorial plane of the tire, and two shoulder zones in axially-opposite positions with respect to the equatorial zone, wherein each transversal groove comprises an equatorial groove portion in the equatorial zone and a shoulder groove portion in one of the shoulder zones, wherein the transversal grooves are circumferentially distributed in groups alternately extending from the axially-opposite shoulder zones, wherein the groups of transversal grooves define a plurality of substantially-continuous tread portions in the equatorial zone, wherein each of the transversal grooves ends at a predetermined distance from the equatorial groove portion of a longest transversal groove of the axially-opposed group of transversal grooves so that all of the transversal grooves end within the equatorial zone, wherein the substantially-continuous tread portions alternately extend from opposite shoulder zones towards the equatorial plane of the tire to form a substantially-continuous grid, wherein the tread further comprises a central depression formed astride the equatorial plane of the tire, wherein the central depression comprises a maximum depth comprised between 40% and 60% of a depth of the transversal grooves, and wherein the central depression comprises a width greater than or equal to 15 mm and less than or equal to 25 mm.

34. A set of tires, comprising:

two tires for mounting on front wheels of a vehicle; and two tires for mounting on rear wheels of the vehicle;

wherein the tires for mounting on the front wheels each comprise a first tread, wherein the tires for mounting on the rear wheels each comprise a second tread, wherein each tire comprises a curvature ratio not greater than 0.1, wherein the first and second treads each comprise an equatorial zone, extending on both sides of an equatorial plane of a respective tire, and two shoulder zones in axially-opposite positions with respect to the equatorial zone of the respective tire, wherein the first and second treads each further comprise a plurality of transversal grooves, wherein, in the first and second treads, each transversal groove comprises an equatorial groove portion in an equatorial zone of the respective tire and a shoulder groove portion in one of the shoulder zones of the respective tire, wherein, in the first treads, the transversal grooves are circumferentially distributed in groups alternately extending from axially-opposite shoulder zones of the respective front tire, each group comprising three to five transversal grooves, wherein, in the second treads, the transversal grooves are circumferentially distributed in groups alternately extending from axially-opposite shoulder zones of the respective rear tire, each group comprising five to seven transversal grooves, wherein, in the first and second treads, the groups of transversal grooves define a plurality of substantially-continuous tread portions in the equatorial zone of the respective tire, wherein, in the first and second treads, each of the transversal grooves ends at a predetermined distance from the equatorial groove portion of a longest transversal groove of the axially-opposed group of transversal grooves so that all of the transversal grooves end within the equatorial zone of the respective tire, wherein, in the first and second treads, the substantially-continuous tread portions alternately extend from opposite shoulder zones towards the equatorial plane of the respective tire to form a substantially-continuous grid, and wherein each of the first treads further comprises a central depression formed astride the equatorial plane of the respective tire.

35. The set of tires of claim 34, wherein the central depressions comprise a maximum depth comprised between 40% and 60% of a depth of the transversal grooves, and wherein the central depressions comprise a width comprised between 15 mm and 25 mm.

36. A method of optimizing road behavior of a vehicle equipped with a set of tires, the method comprising:

mounting two tires on a front, steering axis of the vehicle; and mounting two tires on a rear, tractive axis of the vehicle;

wherein each tire comprises a curvature ratio not greater than 0.1, wherein each front tire comprises a first tread, wherein each rear tire comprises a second tread, wherein each tread comprises an equatorial zone, extending on both sides of an equatorial plane of a respective tire, and two shoulder zones in axially-opposite positions with respect to the equatorial zone of the respective tire, wherein each tread further comprises a plurality of transversal grooves, wherein each transversal groove comprises an equatorial groove portion in the equatorial zone of the respective tire and a shoulder groove portion in one of the shoulder zones of the respective tire, wherein the transversal grooves are circumferentially distributed in groups of transversal grooves alternately extending from the axially-opposite shoulder zones of the respective tire, wherein the groups of transversal grooves define a plurality of substantially-continuous tread portions in the equatorial zone of the respective tire, wherein the transversal grooves of a first group of transversal grooves are inclined in an opposite direction with respect to the equatorial plane of the respective tire relative to the transversal grooves of an axially-opposed group of transversal grooves of the respective tire, wherein each of the transversal grooves ends at a predetermined distance from the equatorial groove portion of a longest transversal groove of the axially-opposed group of transversal grooves of the respective tire so that all of the transversal grooves end within the equatorial zone of the respective tire, wherein the substantially-continuous tread portions alternately extend from opposite shoulder zones towards the equatorial plane of the respective tire to form a substantially-continuous grid, wherein, in each first tread, equatorial groove portions of the transversal grooves form a fifth angle substantially equal to 45° with respect to the equatorial plane of the respective tire, wherein each first tread comprises a central depression formed astride the equatorial plane of the respective tire, and wherein, in each second tread, equatorial groove portions of the transversal grooves form a sixth angle greater than or equal to 30° and less than or equal to 50° with respect to the equatorial plane of the respective tire.

* * * * *